United States Patent [19]

Schmidt

[11] Patent Number: 4,524,733
[45] Date of Patent: Jun. 25, 1985

[54] MODIFIED FULL-FLOW FILTER AND BY-PASS FILTER APPARATUS FOR INTERNAL COMBUSTION ENGINES

[75] Inventor: Donald R. Schmidt, San Antonio, Tex.

[73] Assignee: Encon Systems, Ltd., San Antonio, Tex.

[21] Appl. No.: 550,872

[22] Filed: Nov. 14, 1983

Related U.S. Application Data

[63] Continuation-in-part of Ser. No. 513,733, Jul. 14, 1983, Pat. No. 4,452,695.

[51] Int. Cl.³ .................................................. F01M 1/00
[52] U.S. Cl. ................................ 123/196 A; 184/6.21; 184/6.24
[58] Field of Search ........ 123/196 A, 196 AB, 196 R; 210/168; 184/6.24, 6.21

[56] References Cited

U.S. PATENT DOCUMENTS

| | | | |
|---|---|---|---|
| 4,298,469 | 11/1981 | Le Blanc | 210/168 |
| 4,324,213 | 4/1982 | Kasting et al. | 123/196 A |
| 4,406,784 | 9/1983 | Cochran | 123/196 A |

FOREIGN PATENT DOCUMENTS

| | | | |
|---|---|---|---|
| 1253951 | 8/1967 | Fed. Rep. of Germany | 184/6.24 |
| 1264502 | 6/1961 | France | 184/6.24 |
| 517700 | 10/1976 | U.S.S.R. | 123/196 A |

*Primary Examiner*—E. Rollins Cross
*Attorney, Agent, or Firm*—Gunn, Lee & Jackson

[57] ABSTRACT

Oil filter apparatus including a first modified high performance full-flow filter and a second super efficient by-pass filter. The modified full-flow filter is adapted to permit the attachment of a by-pass filter hose thereto on the forward end thereof for passage of a portion of oil from the modified full-flow filter to the by-pass filter. A drain plug hose is further connected to the by-pass filter for passage of oil from the by-pass filter to the oil pan. The by-pass filter hose and drain plug hose are connected to the modified full-flow filter, by-pass filter, and the oil pan by means of pivotal swivel fittings adapted to permit attachment of the filter apparatus to any make automobile. The by-pass filter may be mounted inside of a neoprene coated nylon sleeve, by a special mounting bracket, or by a modified by-pass filter base. A method of retrofitting an engine to accommodate the oil filter apparatus is also provided.

11 Claims, 7 Drawing Figures

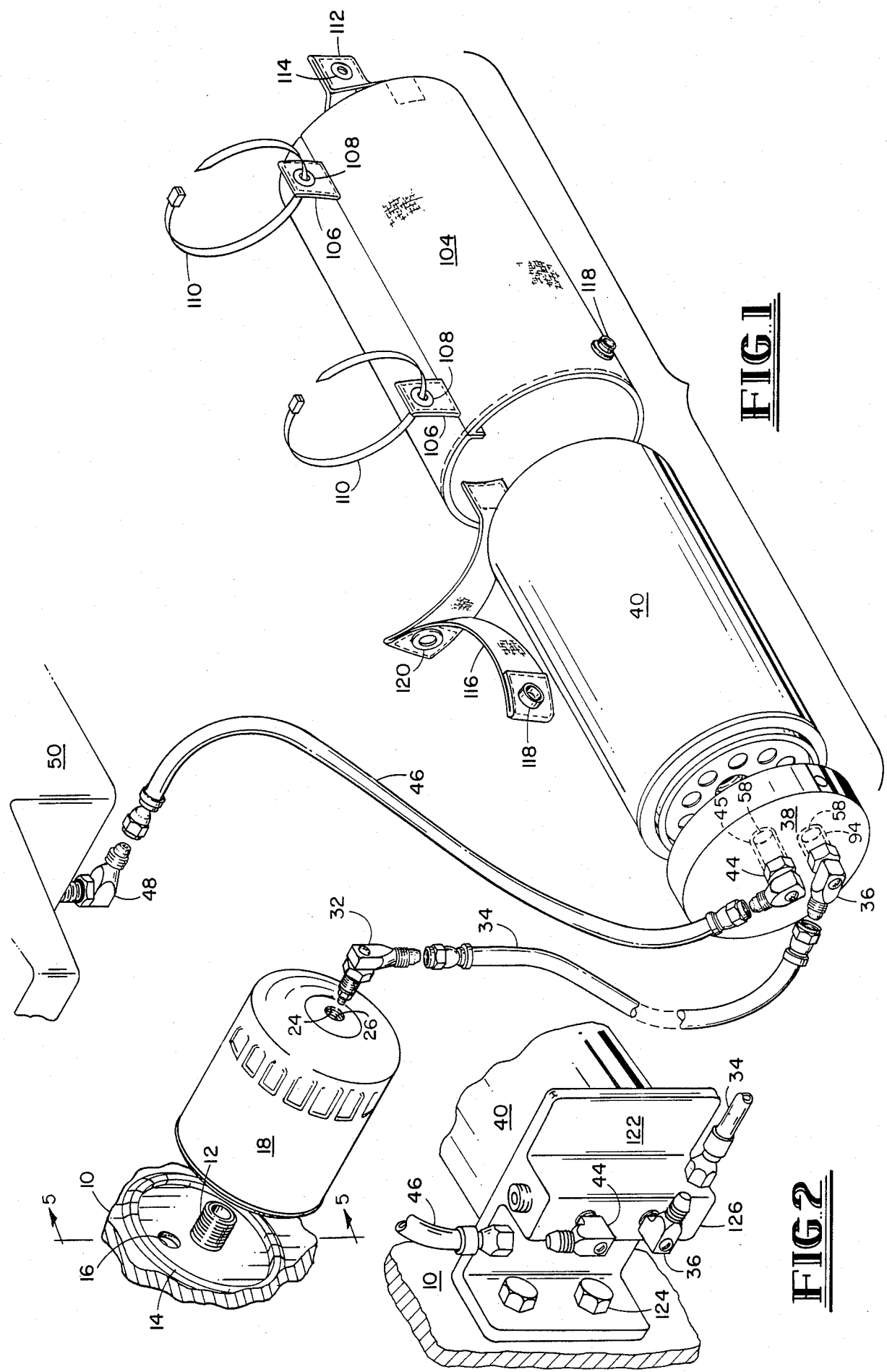

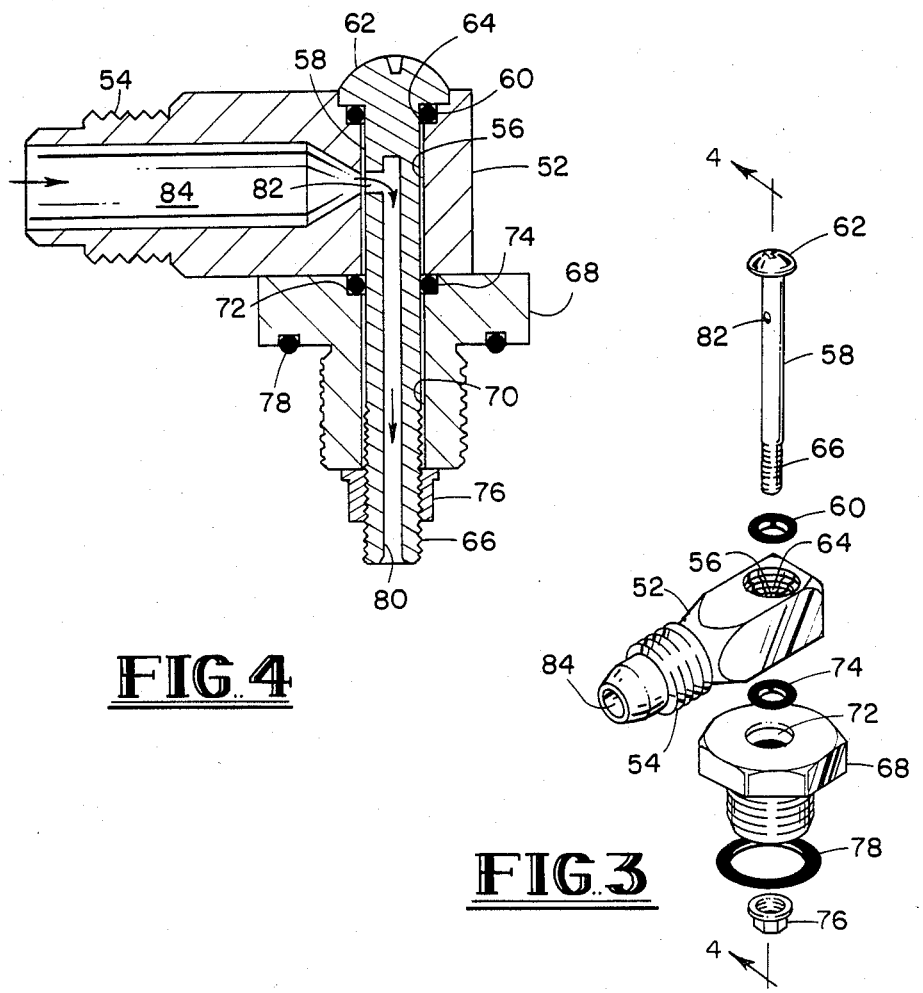
FIG. 4
FIG. 3
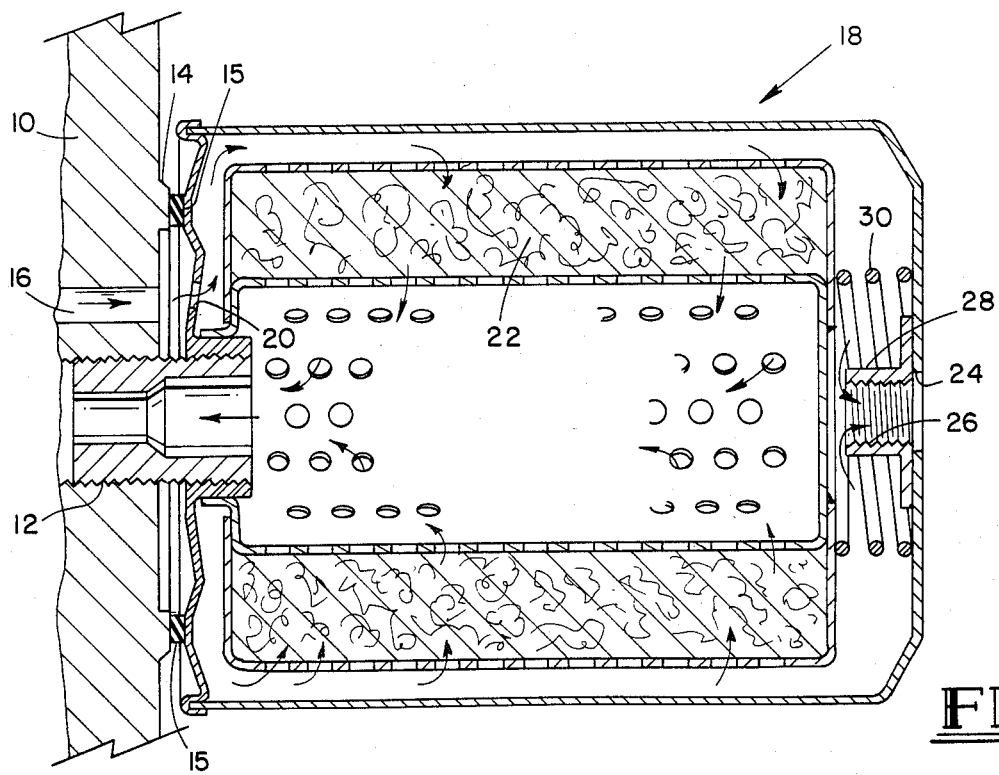
FIG. 5

MODIFIED FULL-FLOW FILTER AND BY-PASS FILTER APPARATUS FOR INTERNAL COMBUSTION ENGINES

The present application is a continuation-in-part of U.S. patent application Ser. No. 513,733 filed July 14, 1983, now U.S. Pat. No. 4,452,695, entitled Full-Flow And By-Pass Filter Conversion System For Internal Combustion Engines.

BACKGROUND OF THE INVENTION

The present invention relates to oil filter apparatus and, more particularly, to a modified high performance full-flow filter and a super efficient by-pass filter for use in the oil flow system of an internal combustion engine. A normal spin-on full-flow filter is replaced with a modified high performance full-flow filter having a threaded orifice on the forward end thereof. The threaded orifice on the forward end of the modified full-flow filter is adapted to receive a right angle swivel fitting for attachment of a by-pass filter hose between the modified full-flow filter and the by-pass filter. The by-pass filter is also provided with a modified right angle swivel fitting for attachment of the by-pass filter hose thereto and for restricting the flow of oil into the by-pass filter.

In the present invention, a small portion of the oil flowing through the filter system of an engine (approximately five percent) flows from the modified full-flow filter through the by-pass filter hose and through the by-pass filter. The oil thereafter flows from the by-pass filter to the oil pan on the low pressure side of the oil flow system through a drain plug hose. The drain plug hose is attached to a right angle swivel fitting on the by-pass filter and a right angle swivel fitting on the oil pan. The right angle swivel fittings, including the modified right angle fitting, attached to the modified full-flow filter, by-pass filter, and oil pan have special O-ring seals and hollow bolts to allow for pivotal movement of the right angle fittings to fit the filter apparatus to any particular engine. The by-pass filter may be mounted in proximity to the engine by a variety of suitable means.

DESCRIPTION OF THE PRIOR ART

Prior to the present invention, many different types of filter apparatus have been developed for internal combustion engines, especially for use with automobiles. The most common type of filter used today is the full-flow spin-on disposable filter that is simply removed and thrown away when changing both the oil and filter of the automobile. The term "full-flow" is used because the filter is capable of filtering the entire flow of oil for the engine. These filters are usually of the surface type where the oil flows through a single layer of filter paper or the like. They have a high flow rate and may be of reasonably compact size. The full-flow filters require relatively low pump pressure, but are not entirely adequate to remove all foreign matter from the oil. Continued operation of the automobile without replacing the filter will permit a gradual increase in the amount of foreign matter in the oil, particularly oxides and very fine sludge.

To eliminate this buildup, the present apparatus includes a super efficient by-pass filter whereby approximately five percent of the oil that would normally flow through and be filtered by the full-flow unit flows through a modified full-flow filter to the by-pass filter. The super efficient by-pass filter is capable of significantly reducing chemical degradation and removing substantially all filterable impurities from the oil, but is intrinsically of lower flow capacity such that it requires the oil flow system pressure to sustain oil flow therethrough.

In the past, combination full-flow and high density filtering have been integrated in one single unit, such as shown in Dahm, et al., U.S. Pat. No. 4,036,755. However, such a filtering system is not made in a manner that permits connection to the standard engine filtering system. Also, the high density portion of the filtering would only operate for a much shorter period of time before it would become clogged and the entire flow would then flow through the full-flow portion. Upon clogging of the full-flow portion, the by-pass valve would open and the oil would receive essentially no filtering. Although it is adapted to replace a screw-on, throw-away type filter, the same basic comments are true concerning the filter disclosed in Belgarde, et al., U.S. Pat. No. 2,995,253. Likewise, Beardsley, U.S. Pat. No. 2,680,520, shows a full-flow and part-flow filter combination in a single unit. The filter disclosed therein has the same inherent problems as the previously described full-flow and part-flow filters.

Kennedy, U.S. Pat. No. 2,843,268, is simply another variation of the combination full-flow, part-flow filter that also has the problems of life cycle and the pressure drop which can be effectively utilized in the invention filtering apparatus. Belgarde, U.S. Pat. No. 2,929,506, discloses another modification of the combined full-flow and part-flow oil filter having an inlet transverse to an outlet. Allen, U.S. Pat. No. 2,966,269, and Allen, U.S. Pat. No. 3,021,954, (an improvement over U.S. Pat. No. 2,966,269) again show a combined full-flow and by-pass filter.

U.S. Pat. No. 2,670,851 issued to Curtis discloses a filter adapted to receive a bolt in the forward end thereof. U.S. Pat. No. 2,547,857 issued to Cook discloses a filter adapted to receive a bolt in the forward end thereof and having an inlet passage transverse to an outlet passage. U.S. Pat. No. 3,868,327 issued to Van Gilder and Schmidt discloses a filter adapted for outward passage of oil (after the filtering thereof) through a fitting on the forward end of the filter opposite the inlet fitting. U.S. Pat. No. 2,605,904 issued to Ogilvie, U.S. Pat. No. 2,098,725 issued to Hurn, U.S. Pat. No. 2,076,936 issued to Burckhalter, U.S. Pat. No. 2,271,054 issued to Williams and U.S. Pat. No. 2,559,267 issued to Winslow, et al., all disclose filters adapted for receiving a rod, bar, or bolt on the uppermost or forward end thereof. U.S. Pat. No. 3,317,045 issued to Dummler discloses a filter having an inlet passage opposite an outlet passage.

While all of the patents cited hereinabove show variations in oil filtering, the present invention replaces the standard spin-on type full-flow filter with a high performance modified full-flow filter and a super efficient by-pass filter that is separately installed and mounted in the engine compartment. Furthermore, installation of the separate by-pass filter is facilitated by the use of unique right angle swivel fittings disclosed herein.

SUMMARY OF THE INVENTION

It is an object of the present invention to provide improved filtering apparatus for internal combustion engines, including a modified high performance full-flow filter and a super efficient by-pass filter.

It is another object of the present invention to provide a modified full-flow filter for the standard internal combustion engine normally utilizing a spin-on full-flow type filter. The modified full-flow type filter is adapted to allow passage of a portion of the oil through the modified full-flow filter to a by-pass filter through a filter hose on the forward end of the modified full-flow filter. The portion of oil flows from the by-pass filter through a drain plug hose to the oil pan on the low pressure side of the oil system.

It is a further object of the present invention to provide oil filter apparatus which eliminates the necessity of an adapter for passage of oil to the by-pass filter.

It is yet another object of the present invention to provide special pivotal right angle swivel fittings for the respective filter hoses as they connect to the modified full-flow filter, by-pass filter, and the oil pan. The pivotal right angle swivel fittings comprise a right angle boss adapted to receive a hollow threaded screw with a crossbore therein and O-ring seals to allow pivotal motion of the right angle boss as is often necessary during installation. At least one of the invention swivel fittings is modified to restrict and control oil flow through the by-pass filter. The right angle swivel fitting in the oil pan may also be modified to replace the drain plug.

It is still another object of the present invention to provide a means of supporting or mounting the by-pass filter at any convenient location within the engine compartment of a standard vehicle.

It is still a further object of the present invention to provide a method of retrofitting an engine to accommodate the invention oil filter apparatus.

DESCRIPTION OF THE DRAWINGS

FIG. 1 is a partially exploded view of the invention modified full-flow and by-pass filter apparatus as installed on an engine.

FIG. 2 is a perspective view of an alternate by-pass filter base and means for mounting the by-pass filter.

FIG. 3 is an exploded perspective view of the invention right angle swivel fittings illustrated in FIG. 1.

FIG. 4 is an assembled section view of FIG. 3 along section lines 4—4.

FIG. 5 is an assembled cross-sectional view of the modified full-flow filter as installed on the engine block along section lines 5—5 of FIG. 1.

DESCRIPTION OF THE PREFERRED EMBODIMENT

Figure 6:
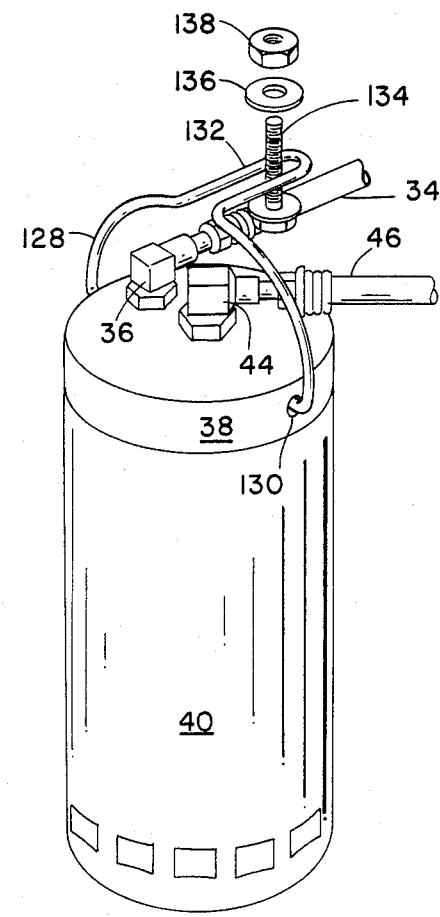
FIG. 6 is a perspective view of an alternative means for mounting the by-pass filter.

Referring to FIG. 1, an engine block 10 has an oil filter bushing 12 mounted therein which is adapted to connect to a conventional full-flow disposable type filter (not shown). The conventional full-flow disposable type filter typically butts against the raised boss 14 of the engine block 10. Oil from an oil pump (not shown) is pumped through orifice 16 at an elevated pressure for flowing through the filter system and other parts of the engine.

In the present invention, the standard full-flow disposable type filter (not shown) is removed and replaced with a modified high performance full-flow filter 18 that is of the spin-on disposable type. As illustrated in FIG. 5, the modified full-flow filter 18 is connected to bushing 12 to permit the flow of oil from the oil pump (not shown) through opening 16 and into modified full-flow filter 18 through opening 20. Seal 15 of the modified full-flow filter 18 seals against boss 14 to prohibit any leakage of oil. As illustrated by the arrows in FIG. 5, a majority of the oil within modified full-flow filter 18 flows around the outside of the filter element 22 and reenters the engine by flowing through filter element 22 and oil filter bushing 12. The remainder of the oil which flows around the outside of the filter element 22, but is not filtered thereby and does not reenter the engine, flows outward through orifice 24 in the forward end of modified full-flow filter 18, as further illustrated by the arrows in FIG. 5. Orifice 24 is preferably aligned with internally threaded passage 26 of a filter bushing 28 which is secured within the forward end of modified full-flow filter 18. Filter bushing 28 is preferably encircled by spring 30 which exerts a continuous downward or rearward pressure on filter element 22.

It is to be understood that the modified full-flow filter 18 receives the full flow of oil through orifice 20 from the oil pump (not shown) and operates in substantially the same manner as most full-flow filters. However, only about ninety-five percent of the engine oil being pumped through opening 16 of the engine block 10 is filtered by the modified full-flow filter 18 before returning to the engine through the rearward end of modified full-flow filter 18. Approximately five percent of the engine oil being pumped through opening 16 of the engine block 10 enters modified full-flow filter 18 and flows around the outside of the filter element 22 without being filtered thereby and flows out of the forward end of modified full-flow filter 18 through bushing passage 26 and modified full-flow filter orifice 24.

As illustrated in FIG. 1, a right angle swivel fitting 32 is provided which is adapted to be threadably connected to and received within the internally threaded passage 26 of bushing 28. A by-pass filter hose 34 is connected on a first end thereof to the right angle swivel fitting 32 and is further connected on a second end thereof to modified right angle swivel fitting 36. Modified right angle swivel fitting 36 is connected to a by-pass filter base 38 which is further connected to a by-pass filter 40, which will be described in more detail hereinbelow.

Oil flowing from the modified full-flow filter 18 through the by-pass filter hose 34 will flow through a threaded opening 94 (shown in reference lines in FIG. 1) in by-pass filter base 38 into by-pass filter 40. The modified right angle swivel fitting 36 is threadably connected in the threaded opening 94 and, as explained hereinbelow, is preferably modified to restrict and control the flow of oil into by-pass filter 40. After the oil flows through the by-pass filter 40, it flows out of the by-pass filter 40 through right angle swivel fitting 44 which is threadably connected in the threaded opening 45 (shown in reference lines in FIG. 1) in by-pass filter base 38. The oil thereafter flows through a drain plug hose 46 which is connected on a first end thereof to right angle swivel fitting 44 and on a second end thereof to right angle swivel fitting 48 which is connected to the oil pan 50 of the engine. The invention apparatus thus provides flow communication between the oil pump (not shown) on the high pressure side of the engine oil system to the oil pan 50 on the low pressure side of the oil flow system.

As illustrated in FIG. 3 and FIG. 4, the invention right angle swivel fittings 32, 36, 44, and 48 include a right angle boss 52 for threadable connection to the appropriate flexible hose by means of threads 54. On the end of right angle boss 52 opposite threads 54 is a transverse passage 56 which is adapted to receive a hollow bolt or screw 58. At the uppermost end of the hollow screw 58 is located an O-ring seal 60, which may be pressed between the head 62 of hollow screw 58 and shoulder 64 of the right angle boss 52.

On the lowermost end or threaded end 66 of the hollow screw 58 is located a plug nut 68 having a transverse passage 70 for receiving the hollow screw 58 therethrough. The upper portion of the plug nut 68 has a shoulder 72 for compressing O-ring 74 against the right angle boss 52. Threadably connected to the threaded end 66 of the hollow screw 58 is a self-locking nut 76. By tightening the self-locking nut 76, the O-ring seals 60 and 74 prevent the leakage of any oil from the transverse passage 56 and the right angle boss 52. The invention right angle swivel fitting is also provided with an O-ring seal 78 for sealing a threaded connection between plug nut 68 and filter bushing 28, threaded openings 45 and 94 in by-pass filter base 38, and/or the drain plug orifice (not shown) in oil pan 50.

Contained within the hollow screw 58, is a longitudinal passage 80 intersected by transverse passage 82. Oil will therefore flow into and through passage 84 of boss 52, transverse opening or passage 56 of boss 52, transverse passage 82, and outward through longitudinal passage 80, as illustrated by the arrows in FIG. 4. When right angle swivel fittings 32 or 44 are secured to modified full-flow filter 18 or base 38, respectively, oil will flow in the opposite direction through longitudinal passage 80, transverse passage 82, enter transverse opening or passage 56, and flow outward through opening or passage 84.

By the use of the invention right angle swivel fittings 32, 36, 44, and 48, as described hereinabove, the boss 52 and the corresponding flexible hose member connected thereto are free to pivot about the hollow screw 58, while at the same time maintaining a leakproof seal by means of the O-rings 60 and 74. This allows for ease of installation and pivoting of the respective hoses as may be necessary for installation of the invention apparatus on a particular engine. It is also to be understood that the standard drain plug (not shown) in oil pan 50 can be replaced with the invention right angel swivel fitting 48 with the threaded portion of plug nut 68 enlarged or otherwise modified to accommodate the drain plug orifice (not shown) in oil pan 50.

Figure 7:
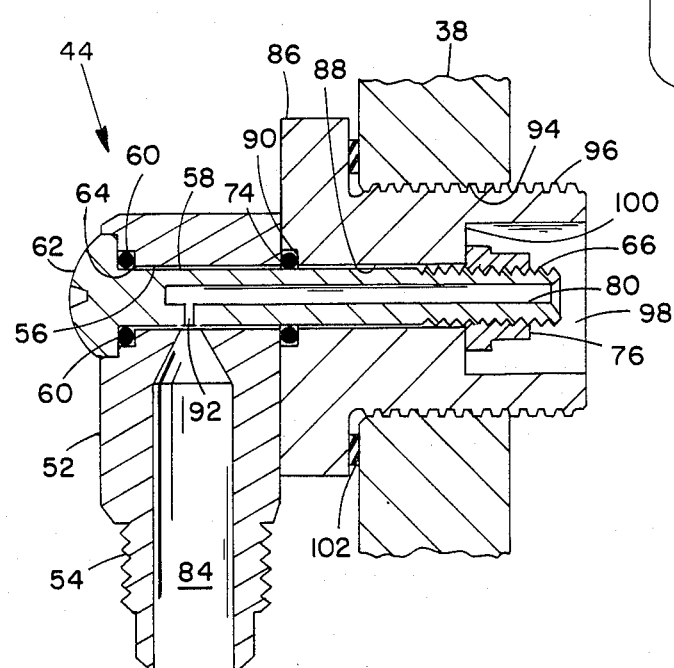
FIG. 7 is a partial assembled cross-sectional view of right angle fitting 36 of FIG. 1.

Referring to FIG. 7 in comparison to FIG. 4, the differences between the invention right angle swivel fittings 32, 36, and 48 and the invention modified right angle swivel fitting 44 can be seen. The same reference numbers will be used when the elements are identical. In FIG. 7, the right angle boss 52, hollow screw 58, and O-rings 60 and 74 remain the same. However, plug nut 68 has been replaced with oil filter bushing nut 86. Oil filter bushing nut 86 has a longitudinal opening 88 therethrough for receiving the hollow screw 58. By tightening the self locking nut 76, the oil filter bushing nut 86 is pressed against the right angle boss 52 to tighten the O-ring seal 60 against shoulder 64 and the O-ring seal 74 against the shoulder 90 of the oil filter bushing nut 86.

Inside of modified right angle fitting 44 is a transverse passage 92, which is smaller than the previously described transverse passage 82. The transverse passage 92 is a restrictive orifice which limits the oil flow therethrough to approximately 0.2 gallons per minute for most engines. However, it may be necessary to adjust up or down the restriction of transverse passage 92 to precisely control the oil flow through the by-pass filter 40. It is to be understood that this adjustment is a function of the design and make of the particular engine with which the invention oil filter apparatus is utilized.

The oil filter bushing nut 86 is threadably received within the threaded opening 45 of the by-pass filter base 38. A substantial portion of the threads 96 of the oil filter bushing nut 86 extend through the threaded opening 45 of the by-pass filter base 38 so that the by-pass filter 40 may be threadably connected thereto (as shown in FIG. 6). A portion of the threaded shank of the oil filter bushing nut 86 has a hollow opening 98 terminating in a shoulder 100. This allows the self-locking nut 76 to be tightened inside of the hollow opening 98, thereby providing a secure modified right angle swivel fitting 44 that does not leak. Furthermore, sealing washer or O-ring 102 is sealed between the head of oil filter bushing nut 86 and the by-pass filter base 38.

It is to be understood that modified right angle swivel fitting 44 also achieves the distinct advantages of pivotal right angle swivel fittings 32, 36, and 48 as recited hereinabove. It is also to be understood that any one or all of the invention swivel fittings 32, 36, 44, or 48 can be a modified swivel fitting as described hereinabove for purposes of controlling and limiting oil flow through by-pass filter 40.

Referring now to FIG. 1, a means for mounting the by-pass filter 40 is provided by sleeve 104. Sleeve 104 has grommet tabs 106 extending therefrom with grommets 108 located therein for inserting clamps or support belts 110 therethrough for connection to any convenient location within the engine compartment. There is also a bottom grommet tab 112 with grommets 114 therein, again for connection of the by-pass filter 40 inside of sleeve 104 at any convenient location within the engine compartment. The uppermost portion of the sleeve 104 also has a snap-on flap 116 for extending over the forward end of the by-pass filter 40 and by-pass filter base 38. Any type of snap 118 may be utilized and a grommet 120 may be provided in the snap-on flap 116.

Referring now to FIG. 2, an alternative means for mounting the by-pass filter 40 is shown. The by-pass filter 40 is secured to a modified by-pass filter base 122 which is adapted to be mounted in the engine compartment by a pair of bolts 124. Modified right angle swivel fitting 36 and right angle swivel fitting 44 are connected to modified by-pass filter base 122 and in flow communication with by-pass filter 40 through a raised boss 126 on base 122.

Referring now to FIG. 6, another alternative means for mounting the by-pass filter 40 is shown. The by-pass filter base 38 may be drilled on either side thereof and a bracket 128 extended into the opposing holes 130 of the by-pass filter base 38. The mounting bracket 128 is similar to a handle on an old fashion fruit jar except that the mounting bracket 128 is of a different shape and made of much stronger material, such as ⅛ inch iron rod. By appropriately bending the iron rod which forms the mounting bracket 128, an upper portion 132 parallel to by-pass filter base 38 is provided. The by-pass filter 40 can then be mounted at any convenient place inside of the engine compartment by extending a bolt 134 through the parallel upper portion 132 into any suitable bolt hole (not shown) located on the vehicle. Thereafter, the bolt 134 need only be secured by a suitable washer 136 and nut 138.

To utilize the present invention in an automotive vehicle, the standard full-flow spin-on type oil filter is removed and replaced with the modified high performance full-flow filter 18 and the by-pass filter 40 is installed in a suitable location within the engine compartment. The by-pass filter hose 34 and drain plug hose 46 are thereafter connected to the respective swivel fittings between the modified full-flow filter 18 and by-pass filter 40 and by-pass filter 40 and oil pan 50, respectively, thereby providing flow communication between the respective components of the filter apparatus.

When the engine is running, oil will flow through opening 16 in the engine block 10 to the modified full-flow filter 18. Approximately ninety-five percent (95%) or a first portion of the oil will flow through filter element 22 to reenter the engine by flowing through oil filter bushing 12. However, about five percent (5%) or a second portion of the oil will flow through the length of modified full-flow filter 18 and out the forward end thereof through orifice 24. The second portion of oil which has not been filtered by filter element 22 flows through swivel fitting 32 from filter 18 into hose 34 through modified swivel fitting 36 from hose 34 into by-pass filter 40, through by-pass filter 40, from by-pass filter 40 into hose 46 through swivel fitting 44, through hose 46, and from hose 46 into oil pan 50 through swivel fitting 48.

It is to be understood that full system pressure of the engine is provided to the by-pass filter 40 and connections thereto. Furthermore, a much denser filter medium is used in by-pass filter 40 than modified full-flow filter 18. Therefore, the return for the by-pass filter 40 is to the oil pan 50. Finally, the pressure drop in the modified full-flow filter 18 is very low; it can, therefore, take the place of the ordinary spin-on filter.

It is to be understood that not all of the fittings 32, 36, 44, and 48 need be right angle swivel fittings; that is, one or more may be right angle swivel fittings. Furthermore, any one or all of the fittings 32, 36, 44, and 48 may be a modified right angle swivel fitting, as shown in FIG. 7.

While the invention modified full-flow filter and by-pass filter apparatus, swivel fittings, and method of retrofitting have been described in connection with their preferred embodiments, it is not intended to limit the invention to the particular forms set forth, but on the contrary, it is intended to cover such alternatives, modifications, and equivalents as may be included within the spirit and scope of the invention as defined by the appended claims.

I claim:

1. Filter apparatus for an internal combustion engine adapted for replacing a normal spin-on full-flow oil filter threadably connected to an oil filter bushing, said engine having an oil pan at a low pressure side of an oil system having an oil pump, said apparatus comprising:
    a modified high performance full-flow filter adapted to be connected to said oil filter bushing to permit oil within said oil system to flow into said modified full-flow filter and to permit most of said oil to flow outward therefrom after filtering thereof by said modified full-flow filter, said modified full-flow filter being further adapted to permit a small portion of said oil to flow outward therefrom prior to filtering thereof through a by-pass bushing located along a centerline of said modified full-flow filter opposite said oil filter bushing;
    a by-pass filter for filtering said small portion of oil, said by-pass filter having a base plate connected thereto;
    a first flexible hose member adapted to be connected on a first end thereof to a first fitting and being adapted to be connected on a second end thereof to a second fitting, said first fitting being adapted to be connected to said by-pass bushing of said modified full-flow filter and said second fitting being adapted to be connected to said base plate for permitting flow communication of said small portion between said modified full-flow filter and said by-pass filter;
    a second flexible hose member adapted to be connected on a first end thereof to a third fitting and being adapted to be connected on a second end thereof to a fourth fitting, said third fitting being adapted to be connected to said base plate and said fourth fitting being adapted to be connected to said oil pan for permitting flow communication of said small portion between said by-pass filter and said oil pan; and
    means for mounting said by-pass filter with respect to said engine, said modified full-flow filter and said by-pass filter being of such respective densities and filtering capabilities that said most of said oil flows from said oil pump through said modified full-flow filter to be filtered therein with a minimum pressure drop and said small portion of oil from said oil pump flows through said modified full-flow filter to be filtered by said by-pass filter prior to returning to said oil pan;
    a least one of said first, second, third and fourth fittings being a right angle fitting that may be rotated after fluid tight connection to give a right angle fitting oriented in any direction in a given plane.

2. Filter apparatus for an internal combustion engine, as recited in claim 1, wherein at least one of said fittings is modified to limit flow of said small portion of oil through said by-pass filter.

3. Filter apparatus for an internal combustion engine, as recited in claims 1 or 2, wherein said base plate is adapted to be mounted with respect to said engine, thereby comprising said means for mounting said by-pass filter.

4. Filter apparatus for an internal combustion engine, as recited in claims 1 or 2, wherein said means for mounting said by-pass filter includes a flexible sleeve in which said by-pass filter is removably located, said flexible sleeve having tabs with holes therein for securing said flexible sleeve and said by-pass filter with respect to said engine.

5. Filter apparatus for an internal combustion engine, as recited in claims 1 or 2, wherein said means for mounting said by-pass filter includes a bracket member pivotally secured on both sides of said base plate, said bracket member being shaped to have a closely spaced parallel upper portion thereof for securing said by-pass filter with respect to said engine with a single bolt.

6. Filter apparatus for an internal combustion engine, as recited in claims 1 or 2, wherein all of said fittings are right angle fittings that may be rotated after fluid tight connection in any direction in a given plane.

7. A method of retrofitting an engine to provide for by-pass oil filtering of a small portion of oil flowing from an oil pump of said engine, said method consisting of the following steps:

removing a spin-on full flow filter from an oil filter bushing;

replacing said spin-on full-flow filter by threadably connecting a high performance modified full-flow filter to said oil filter bushing;

mounting an independent by-pass filter with respect to said engine, said by-pass filter having a base plate connected thereto;

first connecting an inlet side of said by-pass filter through said base plate to a forward end of said modified full-flow filter by a first flexible hose member to receive therethrough said small portion of said oil flowing through said modified full-flow filter;

second connecting a discharge side of said by-pass filter through said base plate to an oil pan of said engine via a second flexible hose member; and replacing a normal drain plug with a special drain plug having a fluid tight, rotatable right angle fitting, said special drain plug being adapted to connect to said oil pan allowing oil from said by-pass filter to flow through said right angle fitting back to said oil pan.

8. The method of retrofitting, as recited in claim 7, wherein an end of said first flexible hose member and an end of said second flexible hose member connecting through said base plate to said by-pass filter and an end of said first flexible hose member connecting to said forward end of said modified full-flow filter are connected through a pivotal right angle swivel fitting.

9. The method of retrofitting, as recited in claim 7 or 8 wherein said mounting step includes inserting said base plate and by-pass filter into a sleeve member, said sleeve member having tabs for securing said by-pass filter with respect to said engine.

10. The method of retrofitting, as recited in claim 7, or 13 wherein said mounting step includes bracket means pivotally secured to both sides of said base plate, said bracket means having a closely spaced parallel upper portion for securing said by-pass filter with respect to said engine with a single bolt.

11. The method of retrofitting, as recited in claim 7, or 8 wherein said mounting step includes bolting said base plate with respect to said engine for securing said by-pass filter with respect to said engine.

* * * * *